(12) United States Patent
Wahl et al.

(10) Patent No.: US 8,302,009 B2
(45) Date of Patent: Oct. 30, 2012

(54) SYSTEM AND METHOD FOR TASK MANAGEMENT

(75) Inventors: Daniel John Wahl, Rosemount, MN (US); Jeffrey Steven Howell, Big Lake, MN (US); Kristin Marie Slieter, Apple Valley, MN (US); Kathryn Marie Schoepf, Minneapolis, MN (US); Erin Kathleen Arnoldi, Inver Grove Heights, MN (US); Senthil Dhandapani Kumar, Lakeville, MN (US); Jennifer Lynn Stanek, Hudson, WI (US)

(73) Assignee: Target Brands, Inc., Minneapolis, MN (US)

( * ) Notice: Subject to any disclaimer, the term of this patent is extended or adjusted under 35 U.S.C. 154(b) by 957 days.

(21) Appl. No.: 12/121,425

(22) Filed: May 15, 2008

(65) Prior Publication Data

US 2009/0288030 A1    Nov. 19, 2009

(51) Int. Cl.
 *G06F 3048/200601* (2006.01)
(52) U.S. Cl. .................................... 715/722; 718/100
(58) Field of Classification Search ........ 705/7.13–7.26; 718/100
See application file for complete search history.

(56) References Cited

U.S. PATENT DOCUMENTS

| | | | | |
|---|---|---|---|---|
| 5,995,940 | A * | 11/1999 | Ramaley | 705/7.12 |
| 7,117,162 | B1 | 10/2006 | Seal et al. | 705/9 |
| 2002/0007300 | A1 | 1/2002 | Slatter | 705/9 |
| 2002/0128889 | A1 | 9/2002 | Kroeger | 705/8 |
| 2002/0133390 | A1 | 9/2002 | Kroeger | 705/9 |
| 2002/0143594 | A1 | 10/2002 | Kroeger | 705/8 |
| 2003/0126004 | A1 | 7/2003 | Miller et al. | 705/9 |
| 2003/0139955 | A1 | 7/2003 | Kirii et al. | 707/7 |
| 2003/0158770 | A1 | 8/2003 | Carlson et al. | 705/9 |
| 2004/0068427 | A1 * | 4/2004 | Su | 705/9 |
| 2004/0267595 | A1 | 12/2004 | Woodings et al. | 705/9 |
| 2005/0060215 | A1 | 3/2005 | Mizutani et al. | 705/7 |
| 2006/0106846 | A1 * | 5/2006 | Schulz et al. | 707/101 |
| 2006/0107265 | A1 * | 5/2006 | Schulz et al. | 718/100 |
| 2006/0190341 | A1 * | 8/2006 | Riley et al. | 705/26 |
| 2006/0213817 | A1 * | 9/2006 | Scott et al. | 209/584 |
| 2006/0282302 | A1 | 12/2006 | Hussain | 705/9 |
| 2006/0294140 | A1 * | 12/2006 | Schemionek et al. | 707/104.1 |
| 2007/0219842 | A1 | 9/2007 | Bansal et al. | 705/9 |
| 2007/0234210 | A1 | 10/2007 | Bukovec et al. | 715/700 |

(Continued)

OTHER PUBLICATIONS

Desk Share Inc., "Project Desk," http://www.projectdesk.net/?gclid=ConR5PuxsZACFQVBMAodsQ0DHA (accessed Dec. 19, 2007).

(Continued)

*Primary Examiner* — Robert Stevens
*Assistant Examiner* — Phuong Nguyen
(74) *Attorney, Agent, or Firm* — Nixon & Vanderhye P.C.

(57) ABSTRACT

A method of assigning tasks is provided. In one embodiment, the method includes displaying, on a user interface, one or more representations of tasks and a calendar of dates, each representation being indicative of a task to be completed. The method also includes receiving a user input indicative of a selected date from the calendar of dates and receiving a user input indicative of a selected representation of the one or more representations. The selected representation corresponds to a selected task. The selected date is assigned to the selected task. Further, the method also includes displaying on the user interface a list of constituents as a function of the selected date, receiving a user input indicative of a selected one or more constituents from the list, and assigning the selected one or more constituents to the selected task.

18 Claims, 7 Drawing Sheets

U.S. PATENT DOCUMENTS

2007/0245300 A1  10/2007  Chan et al. .................... 717/105
2007/0288289 A1  12/2007  Motoyama et al. ................ 705/9
2008/0040386 A1*  2/2008  Godley ...................... 707/104.1
2008/0086500 A1*  4/2008  Garcia et al. .............. 707/103 R
2009/0024437 A1*  1/2009  Ingman et al. .................... 705/9

OTHER PUBLICATIONS

Optihper, "A Computer-Based Decision Support System for Employee Timetabling Problems," http://www.dsic.upv.es/users/ia/gps/optihper/OpitHPER%20Brochure%20(english).pdf (publicly available at least by Dec. 18, 2007).

Sabre Airline Solutions, "Sabre Streamline Suite," http://www.sabreairlinesolutions.com/products/operate/streamline.htm (accessed Dec. 18, 2007).

In Vision Software, "SchedulePro," http://www.invisionwfm.com/uk/enguk/products/scheduling/schedulepro (accessed Dec. 18, 2007).

Declaration of Kristin Slieter, dated Jul. 25, 2008.

* cited by examiner

FIG. 1

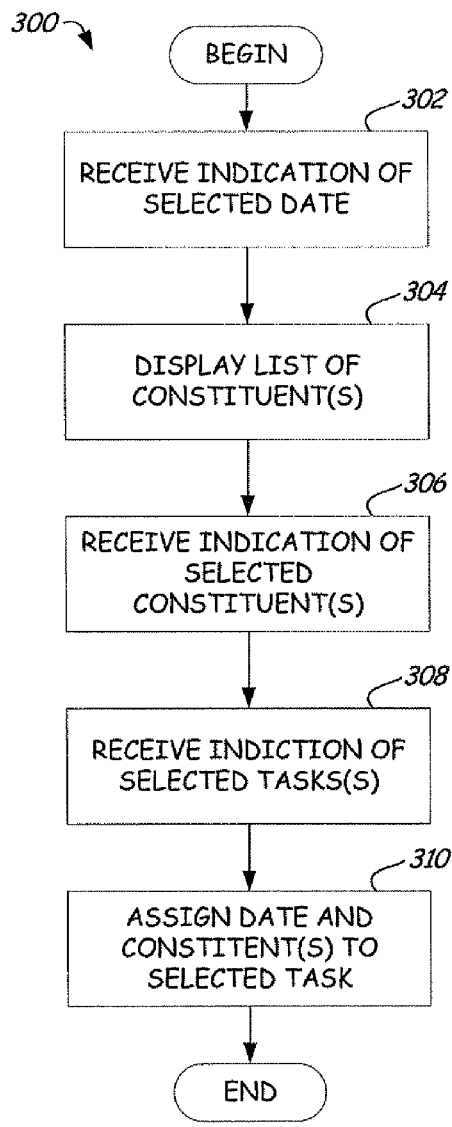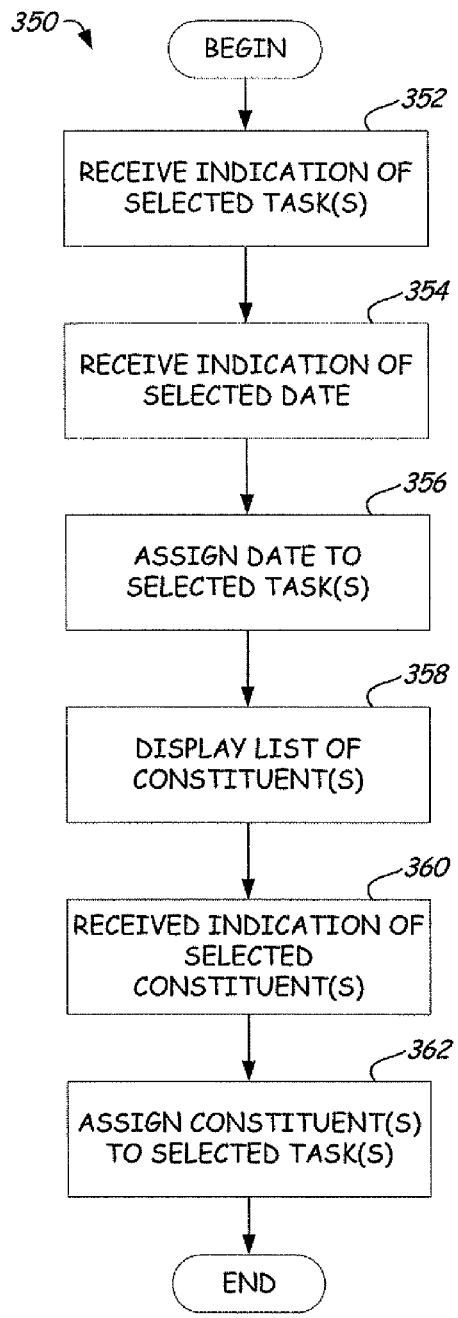
FIG. 3A
FIG. 3B

| Assign the Day | Assigned POGs to a Day | Assigned Hours to a Day of Adjacency |
|---|---|---|
| [+] Overdue 12/30 & 01/06 | 0 of 0 | 0.0 of 0.0 |
| [-] Current Week 01/13 | 0 of 0 | 0.0 of 0.0 |
|    [-] Planograms | 0 of 0 | 0.0 of 0.0 |
|       [+] DOMESTICS | 0 of 0 | 0.0 of 0.0 |
|       [+] GPHIA | 0 of 0 | 0.0 of 0.0 |
|    [+] Revisions | 0 of 0 | 0.0 of 0.0 |
| [+] Next Week 01/20 | 0 of 0 | 0.0 of 0.0 |
| [+] Two Weeks Out 01/27 | 0 of 0 | 0.0 of 0.0 |

| Assign Team Members | Assigned POGs to a TM | Hours Assigned to a TM of Adjacency |
|---|---|---|
| [+] Overdue 12/30 & 01/06 | 0 of 0 | 0.0 of 0.0 |
| [+] Current Week 01/13 | 0 of 0 | 0.0 of 0.0 |
| [+] Next Week 01/20 | 0 of 0 | 0.0 of 0.0 |
| [+] Two Weeks Out 01/27 | 0 of 0 | 0.0 of 0.0 |

FIG. 4

SYSTEM AND METHOD FOR TASK MANAGEMENT

BACKGROUND

The present disclosure relates generally to planning and management of tasks, and in particular, but not limited to, a user interface for providing a task planning and management tool.

Task planning and management are important aspects for many organizations such as businesses, schools, governmental entities, to name a few. For example, in a business context, task planning and management involves the planning, organization and management of resources to complete specific goals and objectives. Tasks are often a part of a set of actions to accomplish a particular job, problem, assignment, etc. In many instances, task planning and management may be constrained by parameters, such as work schedules, abilities, certifications, as well as parameters relating to the task, such as scope, quality, quantity, budget, to name a few.

In the context of a retail sales environment, one example of tasks to be performed is the setting of products and signage in store aisles. The arrangement of products and signs is often represented by "planograms." In general, planograms ("POGs") define placement and display of products and signs in a store. A planogram can include any level and specificity of information including, for instance, visual diagrams, drawings, photos, and/or flow charts. Further, planograms can include tables having entries identifying attributes for a product-related task, such as product placement within a retail store, for example. The planogram can include department, product information, and/or location information. To facilitate completion of the tasks represented by the planograms, in one example the tasks represented by the planograms are assigned to employees of a company and/or to a date for completion.

The discussion above is merely provided for general background information and is not intended to be used as an aid in determining the scope of the claimed subject matter.

SUMMARY

A method of assigning tasks is provided. In one embodiment, the method includes displaying, on a user interface, one or more representations of tasks and a calendar of dates, each representation being indicative of a task to be completed. The method also includes receiving a user input indicative of a selected date from the calendar of dates and receiving a user input indicative of a selected representation of the one or more representations. The selected representation corresponds to a selected task. The selected date is assigned to the selected task. Further, the method also includes displaying on the user interface a list of constituents as a function of the selected date, receiving a user input indicative of a selected one or more constituents from the list, and assigning the selected one or more constituents to the selected task.

BRIEF DESCRIPTION OF THE DRAWINGS

FIG. 1 illustrates a user interface for a task planning and management tool, under one embodiment.

FIG. 3A is a flow diagram of a method of assigning tasks, under one embodiment.

FIG. 3B is a flow diagram of a method of assigning tasks, under one embodiment.

FIG. 4 illustrates an exemplary user interface window for displaying representations of tasks.

DETAILED DESCRIPTION

Figure 2:
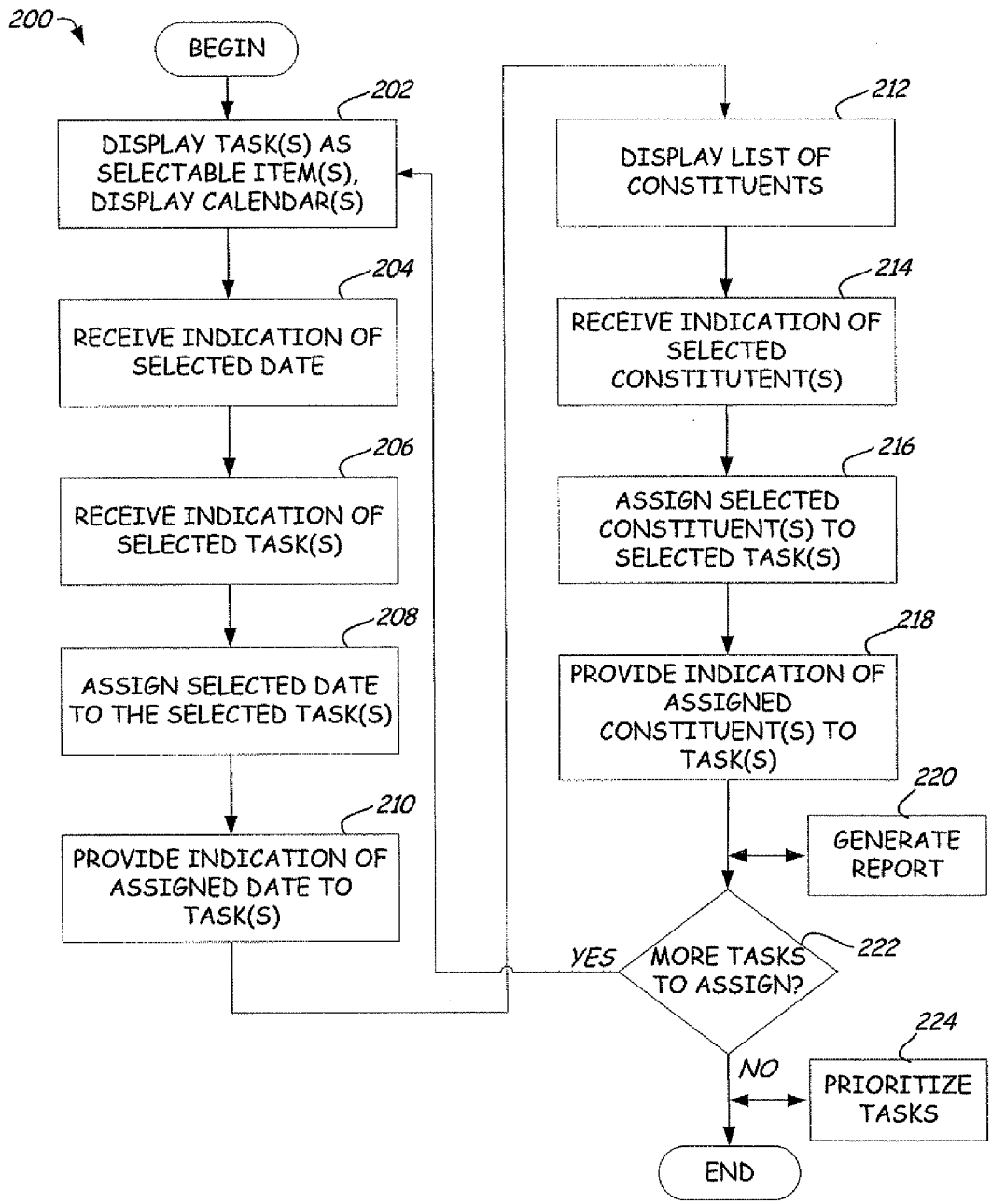
FIG. 2 is a flow diagram of a method of assigning tasks, under one embodiment.

The concepts described herein are directed to a system and method for task planning and management. In one embodiment, a user interface is provided for assigning parameters to tasks, including, but not limited to, assigning date(s) and constituent(s) to tasks. For example, in one embodiment, visual representations of tasks, such as planograms (POGs), are provided to a user through a user interface. The user selects one or more tasks from the representations. The user utilizes the user interface to assign date(s) and/or employee(s) for completing the selected task(s).

Figure 1:
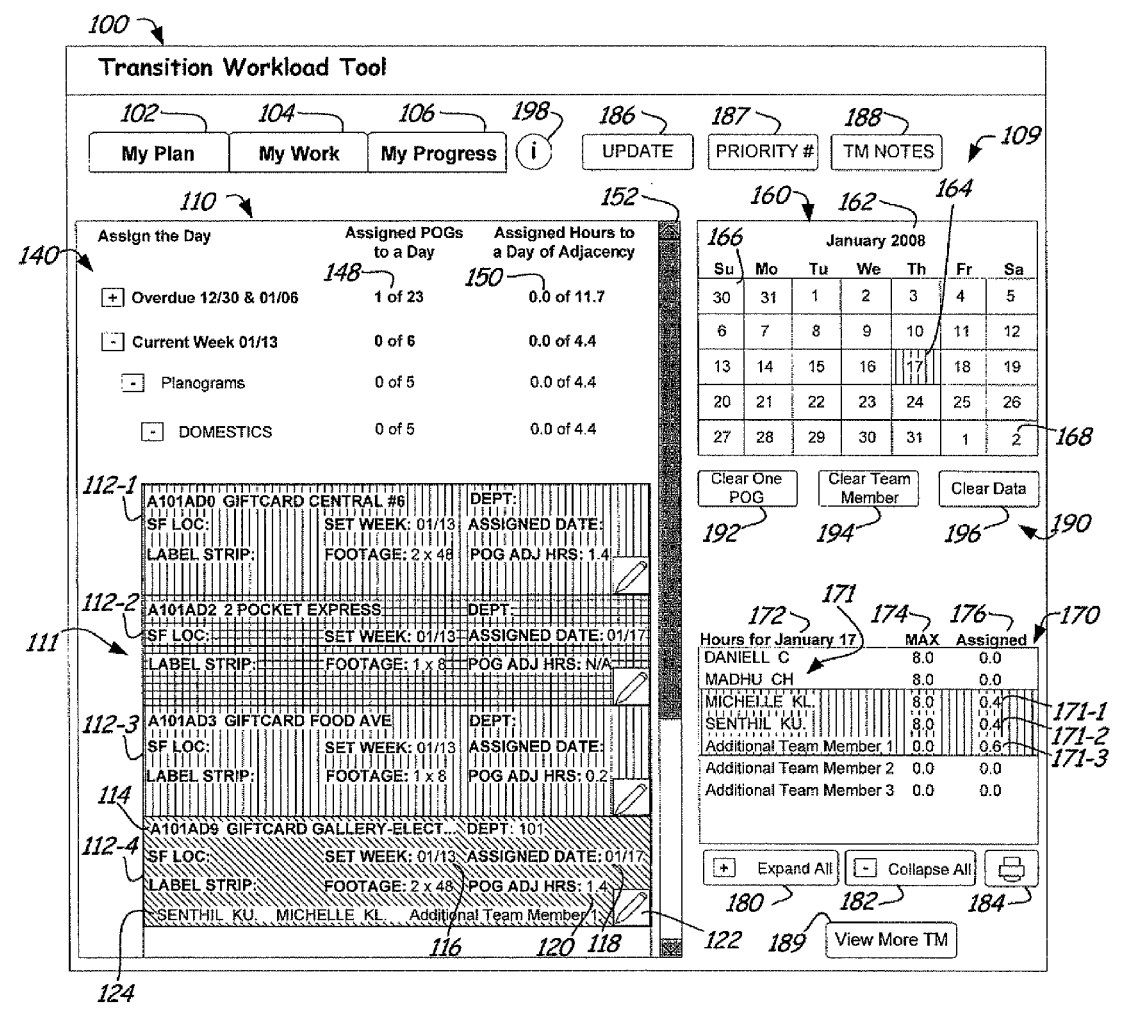

In accordance with one embodiment, FIG. 1 illustrates a user interface 100 for a task planning and management tool configured to be utilized by a user to plan, manage, and/or complete tasks. User interface 100 is illustratively a user interface that provides a plurality of controls for interaction with a user. User interface 100 includes a number of selectable tabs 102, 104, and 106 for accessing various modules and components of the task planning and management tool.

In FIG. 1, a task planning portion 109 of user interface 100 is illustrated and includes a task window 110, a date window 160, and a constituent window 170. Task window 110 includes a portion 111 for displaying visual representations or entries of tasks. A plurality of representations or entries 112-1, 112-2, 112-3, and 112-4 (collectively referred to as representations 112) are illustrated in FIG. 1. Visual representations 112 of tasks are illustratively representations of planograms. Although representations 112 are illustrated as representing planograms, it is noted that any type of tasks and task representation format is within the scope of the concepts described herein.

Task representations 112 include a plurality of information relating to each represented task. For example, in the context of planograms, each representation 112 includes information relating to product descriptions (e.g., product name, price, quantity, etc.), department information (e.g., department name, division, etc.), display information (e.g., label information, display size, display location), and/or store information (e.g., store number, store floor location, etc.), and/or any other relevant information. In the illustrated embodiment, each representation 112 includes a description field 114 that provides an identifier that associates the representation 112 with a task. Further, a set week 116 is also provided that identifies a time and/or date that the task represented by the representation 112 is to be planned or assigned. For example, in the illustrated embodiment, each representation 112 has a set week field of "1/13" indicating that the tasks are to be assigned a date and constituent(s) by a user of interface 100 during the week of January 13.

An assigned date field 118 is also provided and includes information relating to a date assigned to the represented task. The assigned date is illustratively a date the task is scheduled to be performed. Further, each representation 112 includes a field 120 that provides an estimated time required for completing the task. A note icon 122 is also provided with each representation 112 and is utilized to create, view, and/or edit notes associated with each represented task. Alternatively, or in addition, a notes icon 188 is provided that enables a user of interface 100 to create, view, and/or edit notes for particular constituents. For example, the user selects icon 188 which opens a window that allows the user to create general notes for all constituents in window 170 and/or notes for selected constituents from window 170.

Each representation 112 also includes an assigned constituent field 124 that displays constituents (e.g., employees, groups, businesses, etc.) that have been assigned to the particular task.

Task window 110 is illustratively divided into a plurality of expandable lists 140. Each element of list 140 corresponds to a category and/or subcategory for grouping representations 112. In the illustrated embodiment, expandable lists 140 include categories based on a set week (e.g., a date that the tasks are to be planned or assigned, a date that the tasks are to be performed, etc.). Further, as illustrated, expandable lists 140 also include subcategories such as representation type (e.g., planograms, revisions, etc.) and/or department (e.g., domestics, housewares, electronics).

In the illustrated embodiment, each category includes columns 148 and 150 that provide indications of the amount of work that has been assigned to a day. For example, column 148 indicates a ratio of the number of tasks that have been assigned to a day relative to a number of total tasks in the category. Column 150 provides similar information on an hourly basis (i.e., hours assigned vs. total hours to be assigned).

In one embodiment, data in interface 100, including columns 148 and 150, is updated automatically as task representations 112 in window 110 are assigned dates and/or constituents. In another embodiment, columns 148 and 150 are not updated automatically. An update control, such as a user selectable update button 186, is provided to enable a user to refresh or update the data in interface 100, including columns 148 and 150, as desired. A scroll bar 152 is provided to enable window 110 to be scrolled.

In accordance with one embodiment, categories 140 and representations 112 are selectable items within user interface 100. For example, a user utilizes an input device, such as a keyboard, mouse, trackball, touchpad, touchscreen, microphone, or the like, to expand or collapse categories 140 and/or select one or more of the representations 112. Further, in one embodiment a user selects particular tasks from representations 112 to view additional information relating to the tasks. For example, a user selects (e.g., right-clicks) a representation to view a planogram for the task. As discussed above, an exemplary planogram defines placement and display of products in a store and includes, for instance, visual diagrams, drawings, photos, and/or flow charts. Also, in one embodiment, a user edits representations 112, if desired. For example, a user selects a representation 112 to add, delete, and/or modify data for the represented task.

As illustrated in FIG. 1, interface 100 also includes a date window 160 that provides user-selectable dates and/or times. In the illustrated embodiment, date window 160 includes a calendar of dates and a label 162 for the calendar of dates. The calendar of dates includes a plurality of dates that are displayed in any suitable manner, including, but not limited to, a list and/or a table. As illustrated, date window 160 provides dates for a current month (illustratively January 2008), as well as dates 166 for a previous month and dates 168 for a following month. Date window 160 enables user selection and assignment of dates to one or more tasks in task window 110. In the illustrated example, a date 164 has been selected and is highlighted within window 160. Further, in one embodiment date window 160 includes a control for navigating through the calendar of dates, for example between months.

In one embodiment, date window 160 is configured to enable the user to select a date that is within a prescribed time period. For instance, in one embodiment window 160 only allows a user to select a date from window 160 that is within two weeks from a current week. This includes the current week, one week out (the future week), and two weeks out. In other embodiments, the prescribed time period within which the user can select a date from window 160 for assignment to a task includes a month or a number of months, as well as an indefinite time period.

Interface 100 also includes a constituent window 170 including a user selectable list of constituents. By way of example, a list of constituents includes a list of entities such as employees, work groups, businesses, vendors, and/or contractors, to name a few. Constituent window 170 allows a user to assign one or more constituents to tasks provided in task window 110.

In accordance with one embodiment, constituent window 170 is populated with a list of constituents based on a date selected in date window 160. For instance, a list of constituents 171 are provided that corresponds to employees that are available to perform tasks for the selected date. In the example illustrated in FIG. 1, list 171 includes employees scheduled to work on selected date 164. The list of employees includes a field 174 corresponding to a total or maximum number of hours each employee is scheduled to work for the selected date. Further, the list also includes a field 176 that indicates a number of hours that each employee has been assigned to perform tasks for the selected date. As constituents are assigned to tasks represented in window 110, field 176 is updated based on the estimated completion time 120 for the tasks. In the illustrated example, employees 171-1-171-3 are highlighted to indicate their selection within window 170.

Additionally, in one embodiment generic employee selections (i.e., "Additional Team Member 1", "Additional Team Member 2", "Additional Team Member 3") are provided for selection in window 170. In this manner, in addition to assigning tasks to specific employees provided in list 171 tasks are assigned to representations for generic employee(s). In one embodiment, tasks assigned to generic employee selections are later assigned to specific employee(s), including employees that are provided in list 171 as well as employees that are not provided in list 171. By way of example, tasks assigned to the generic employee selections are later assigned to new employees, employees from other departments or divisions of a company, and/or employees that were previously scheduled off but are later scheduled to work on a selected date assigned to the task.

In one embodiment, a list of all employees of a company, including employees that are not scheduled to work on a selected date, are provided for assignment of tasks. By way of example, this includes employees that have the selected day off as well as employees from other departments and/or divisions of a company. In the illustrated embodiment, a control 189 is provided that enables a user to view a list of additional employees that are not otherwise provided in window 170. Control 189 causes the list of additional employees to be provided in window 170 and/or opens another window for providing the list of additional employees. In this manner, control 189 allows a user to assign tasks to constituents, other than those provided in list 171, including employees in other departments and/or divisions and employees that are not scheduled to work on the selected date (e.g., date 164).

Interface 100 also includes controls 180 and 182 for expanding and collapsing elements within interface 100, such as categories 140 in task window 110. Further, a print icon 184 for generating a report of assignment data is provided. Icon 184 is configured to open a window including controls for printing and/or emailing reports. A user utilizes icon 184 to print and/or email reports for particular days, weeks, and/or months as well as reports for particular employees and/or tasks.

Interface 100 also includes controls 190 for clearing assigned task data. For example, a first control 192 is provided to clear assignment data for selected task(s) represented in window 110. In this manner, a user selects control 192 and then highlights a representation 112 to clear the assigned date and assigned constituent for the selected representation 112. Alternatively, or in addition, a user first selects or highlights one or more representations 112 and then selects control 192 to clear the assigned date and assigned constituents for the selected representations 112.

A second control 194 is also provided for clearing assignment data for selected constituents in list 170. For example, a user selects or highlights one or more constituents from list 170 and then selects (i.e., clicks) control 194 to unassign all tasks that have been previously assigned to the selected constituents for the selected date 164. For instance, control 194 is implemented to unassign an employee from assigned tasks if the employee is unable to perform the assigned task (e.g., the employee is absent from work).

Further, a third control 196 is provided and configured to clear all assigned task(s) and assigned constituent(s) for a selected date. For example, a user selects a date from window 160 and implements control 196 to clear the tasks and constituents assigned to the tasks on the selected date.

In accordance with one embodiment, a user can change or reassign task(s) using interface 100 without having to first clear previously assigned task data. For example, if a particular task represented in window 110 already has an assigned date and constituent(s), the user can select a new date from window 160 and new constituent(s) from window 170 and assign the new date and constituent(s) to the particular task. In this manner, the task representation 112 for the particular task is updated with the new date and constituent(s) assigned to the task.

When dates and/or constituents are assigned to tasks in window 110, interface 100 is updated accordingly to provide visual indications of the assignments. For example, when a date is assigned to a task in window 110, the assigned date field 118 for the corresponding representation 112 of the task is updated to include the assigned date. Similarly, when one or more constituents are assigned to a task in window 110, the constituent field 124 for the representation 112 of the task is updated to include the assigned constituent(s).

Upon assignment to a task in window 110, data for the assigned constituents in window 170 is also updated. For example, when a constituent is assigned to a task in window 110, field 176 in window 170 is adjusted to include the estimated task completion time 120 for the task, or a portion thereof. In one example, the estimated task completion time 120 is divided (either evenly or otherwise) among multiple constituents if more than one constituent is assigned to the same task.

In the embodiment illustrated in FIG. 1, user interface 100 allows a user to prioritize the assigned tasks. For instance, in the case where multiple tasks are assigned to a particular date and/or particular constituent(s), the user of interface 100 sets a priority order for completion of each task. In one example, setting priority for the tasks comprises creating an ordered, ranked list of the tasks. In another example, setting priority for the tasks comprises setting a priority score for each task. When the assigned tasks are to be performed by the constituents, the priority information assigned to the tasks is utilized to set an order for completing the assigned tasks. As illustrated in FIG. 1, a priority control 187 is provided and configured to open a user interface window for assigning the priorities to the tasks representations 112. In another embodiment, the priority for each task is set for each representation 112 in window 110. For instance, representations 112 are arranged by the user by priority level within window 110. In another example, each representation 112 can include a priority data field that receives a user input indicative of the priority of the representation 112.

In one embodiment, the representations 112 include one or more data fields (not shown in FIG. 1) that contain information relating to a status of the task and are indicative of whether the task is ready for assignment by the user of interface 100. In one example, each representation 112 includes a first data field that includes a "percent ready" indicator and a second data field that includes a "percent in-stock" indictor. The "percent ready" indicator informs the user as to whether the task is ready for assignment to a date and constituent(s). The "percent ready" indicator is based on parameters and requirements for the associated task. For instance, in the context of planograms where the represented task includes placement of products, the "percent ready" indicator provides an indication that at least one of the products associated with the planogram are ready for placement on a store shelf, for example. Further, the "percent in-stock" indicator informs the user as to the amount of product that is in-stock for placement on the store shelf. Additionally, in one embodiment the first and second data fields are color-coded based on the status of the indicators. For example, the "percent ready" and "percent in-stock" indicators are color-coded red if the value is below a threshold (e.g., zero, below fifty percent, etc.) and are color-coded green if the value is above a threshold (e.g., 100 percent, above fifty percent, etc.).

In the embodiment illustrated in FIG. 1, each of windows 110, 160, and 170 are provided in a single user interface 100 such that each of windows 110, 160, and 170 are viewable by the user at the same time. In this manner, a user is not required to navigate between user interfaces to view and select items within windows 110, 160, and 170. Further, a help control 198 is also provided and configured to implement help content associated with functions of interface 100.

In the embodiment illustrated in FIG. 1, task planning user interface 109 is accessible by a user through "My Plan" tab 102. Interface 109 allows a user to plan, assign, and schedule tasks to be performed. Using tabs 104 and 106, a user accesses additional functionality for viewing and executing assigned tasks. For example, "My Work" tab 104 allows a user access to a list of tasks that have been assigned to the user. Through tab 104, the user views daily assignments, notes, access planograms and other information relating to completion of the assigned tasks, and/or access any other information pertinent to task completion. Further, in one embodiment an interface is provided to enable a user to view instructions for completing assigned tasks and/or enable the user to indicate that assigned tasks have been completed.

In another example, "My Progress" tab 106 allows a user access to tools for viewing tasks and the completion status of those tasks. For instance, in one embodiment all tasks assigned to a particular date are provided in an interface through tab 106 which will also display what tasks have been completed and what tasks still need to be completed. In another embodiment, tab 106 provides access to an interface that displays all tasks assigned to a particular employee and/or store.

Using interface 100, a user selectively assigns date(s) and constituent(s) to task representations 112 provided in task window 110 in any suitable manner. FIG. 2 illustrates one embodiment of a method 200 for assigning tasks using user interface 100. At step 202, one or more representations of tasks are displayed as selectable items and a calendar of dates is displayed. For example, in the context of FIG. 1, a plurality of selectable representations 112 are displayed in window 110 and a plurality of selectable dates are displayed in date window 160. At step 204, an indication of a selected date from the calendar of dates is received. At step 206, an indication of selected task(s) from the one or more representations is received.

At step 208, the date selected at step 204 is assigned to the task(s) selected at step 206 as a result of selecting the task(s). Thus, simply by selecting one or more task representation(s) 112 from window 110 after selecting the date from date window 160, the date is assigned to the task(s). No further buttons or icons need to be selected to assign the date to the tasks. At step 210, an indication is provided in user interface 100 to indicate that the task(s) have been assigned a date. For instance, the assigned date is provided in an assigned date field 118 for the task representations 112. Further, in one embodiment the representation(s) 112 are color-coded to indicate that a date has been assigned. For example, each representation 112 is coded with a first color (such as red) if a date has not been assigned to the task. Further, each representation is coded with a second color (such as yellow) if a date has been assigned to the task.

At step 212, a list of constituents are displayed in window 170 as selectable items as a result of selecting the date at step 204. In one embodiment, the list of constituents displayed at step 212 includes a list of employees scheduled to work on the selected date. At step 214, an indication of selected constituent(s) is received. For example, a user selects one or more constituents from window 170. At step 216, the constituent(s) selected at step 214 are assigned to the task(s) selected at step 206. Note that the assignment of the constituents is performed simply by selecting the constituents after selecting the task representation 112. No other buttons or icons need to be pressed after selecting the constituents in order to assign the constituents to the task. At step 218, an indication is provided to indicate that the task(s) have been assigned to a constituent. For example, the assigned constituent(s) for the select task are provided in an assigned constituent field 124 in the representation 112. Further, the representation(s) 112 for the selected tasks are color-coded to indicate whether a date and/or constituent has been assigned. For example, each representation 112 is coded with a first color (such as red) if a date and a constituent have not been assigned to the task. Further, each representation 112 is coded with a second color (such as yellow) if a date, but not a constituent, has been assigned to the task. Further, each representation is coded with a third color (such as green) if both a date and a constituent have been assigned to the task. It is noted that this is one example of providing a visual indication to the tasks.

At step 220, a report is generated based on the assigned tasks, dates, and constituents, if desired. At step 222, the method of 200 is repeated for any additional tasks. In accordance with one embodiment of method 200, a step 224 is provided wherein the assigned tasks are prioritized. This includes creating an ordered, ranked list of the assigned tasks and/or setting a priority score for each assigned task. When the assigned tasks are to be performed by the constituents, the priority information assigned to the tasks is utilized to set an order for completing the assigned tasks.

In accordance with other embodiments, date(s) and constituent(s) are assigned to selected tasks in any desired order. For example, FIGS. 3A and 3B illustrate alternative methods 300 and 350 for assigning tasks using interface 100.

Method 300 illustrated in FIG. 3A begins at step 302 where an indication of a selected date is received. For example, a user selects a date from date window 160. At step 304, a list of constituents are displayed based on the selected date. For example, a list of employees scheduled to work on the selected date is displayed in window 170.

At step 306, an indication is received of a selection of one or more constituents. The selected date at step 302 and selected constituent(s) at step 306 are highlighted in windows 160 and 170 to indicate which elements have been selected. At step 308, a user selects one or more tasks representations 112 from a list of tasks to be assigned to the selected date and constituent(s). The date and constituent(s) are assigned to the task(s) at step 310 based on the selection of the task(s) after selecting the date and constituents. Note that the assignment of the date and constituent(s) is performed simply by selecting the task representation 112 after the date and constituent(s) have been selected and highlighted. No further buttons or icons need to be pressed to make the assignment. Assigning a date and constituent(s) to a task involves updating information for the task in an associated database and changing representation 112 to indicate the assignment.

In accordance with one embodiment, interface 100 is configured to automatically "lock" a task, date, and/or constituent from windows 110, 160, and 170 upon user selection. In this manner, a selected date and/or constituent(s) is assigned to a plurality of the tasks in a repeating manner. For example, a user selects a date from window 160 and constituents from window 170 such that the selections are locked. The user then selects multiple representations 112 in window 110 in a sequential manner such that the selected date and constituents are assigned to each of the tasks. Thus, a user is not required to reselect the date and constituents after selection of each task.

Method 350 illustrated in FIG. 3B begins at step 352 where an indication of one or more selected tasks is received. At step 354, an indication of a selected date is received. For example, a user selects task(s) from task window 110 and a date from date window 160. At step 356, the date selected at step 354 is assigned to the task(s) selected at step 352 based on the indication that a date was selected after the task(s) were selected.

At step 358, a list of constituents that are scheduled to work on the selected date is displayed. At step 360, an indication of one or more selected constituents is received. For example, a user selects one or more employees from a list in window 170 that is provided based on scheduled hours for the employees on the selected date. At step 362, the constituent(s) are assigned to the task selected at step 352 based on the selection of the constituent(s) after the selection of the task. Note that no other buttons or icons need to be selected to make the assignment of the constituents to the task. As above, assigning a date and constituent(s) to a task involves updating information for the task in an associated database and changing representation 112 to indicate the assignment.

Methods 200, 300, and 350 are illustratively methods for assigning tasks using user interface 100. As described herein, assigning tasks includes assigning attributes and parameters for completing the tasks, such as dates and constituents, to the tasks such that the attributes and parameters are associated with and/or mapped to the tasks. This also includes assigning the tasks to the dates and/or constituents to associate and/or map the attributes and parameters with the task.

FIG. 4 is a diagram of one embodiment of task window 110 including a portion 450 that displays tasks that have been assigned to a date. For example, with reference to methods 200, 300, and 350, tasks are provided in portion 450 based on the dates assigned to the tasks at steps 208, 310, and 356. In the illustrated embodiment, task representations are provided in a first portion 400 of window 110 in categories 140 based on a set week (i.e., a set date on which the tasks are to be planned). Categories 140 include data fields 148 and 150 that are similar to those described in FIG. 1. Additionally, the tasks that have been assigned a date are also provided in portion 450. Portion 450 also includes a plurality of categories 452 that are illustratively similar to categories 140. Categories 452 include expandable lists of tasks arranged by date, as well as by other criteria such as task type, department, division, to name a few. Further, data fields 454 and 456 are also provided. Data field 454 indicates a number of tasks in the category as a ratio of the number of tasks in the category that have been assigned to a constituent. Data field 456 indicates the number of hours from the total number of hours needed to perform the tasks of the category that have been assigned to constituent(s). In this embodiment, use of window 110 is advantageous when a user has assigned a date to a task, but has not yet assigned a constituent to complete the task assignment. A user utilizes portion 450 of window 110 to browse, select, and assign constituents to the tasks.

Figure 5:
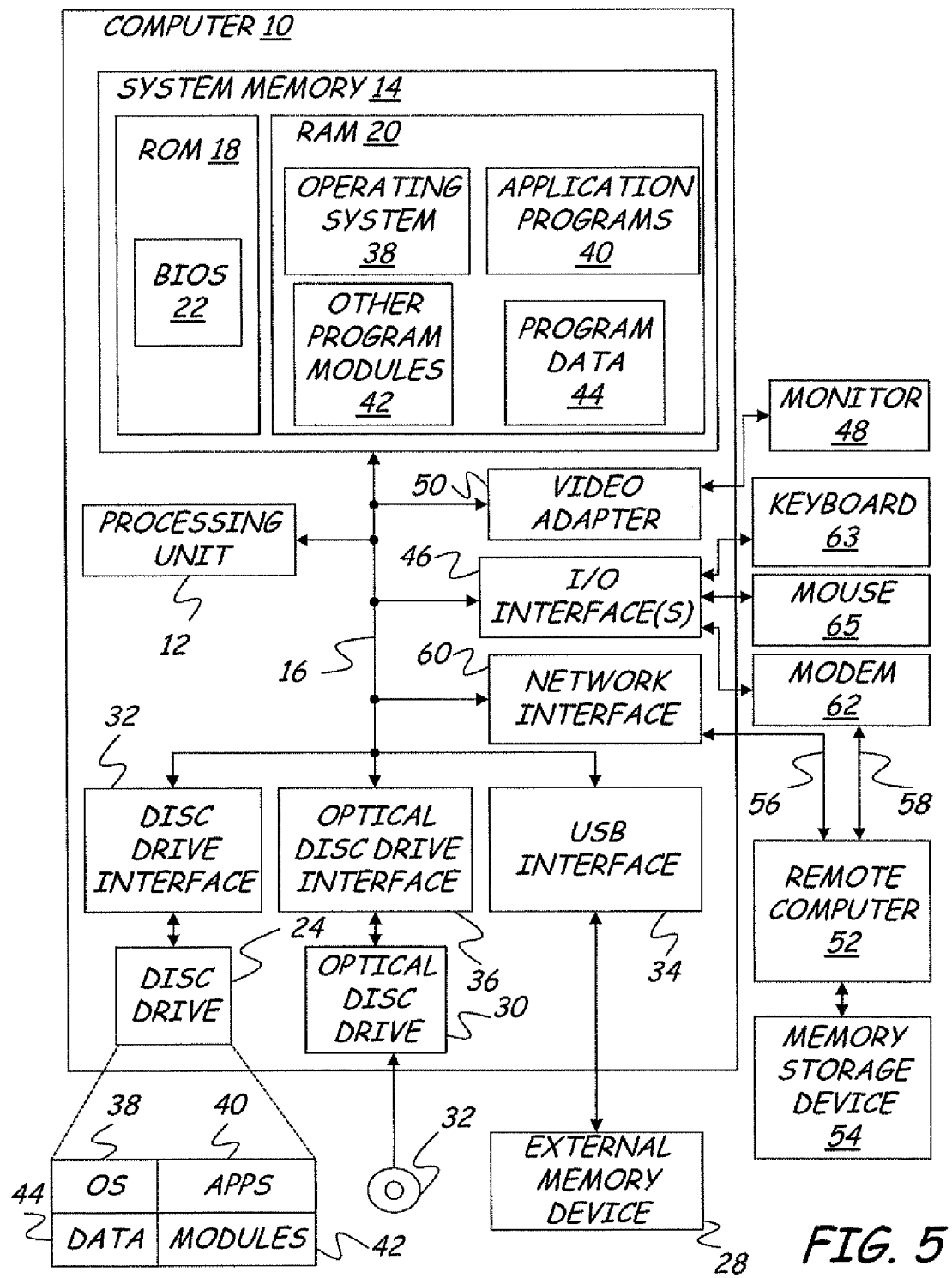
FIG. 5 is a block diagram of an exemplary computing environment in which embodiments are implemented.

FIG. 5 is a block diagram illustrating an exemplary operating environment in which embodiments described herein are implemented. FIG. 5 illustrates a computing device that is used as a server or client device. The computing device 10 of FIG. 5 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the personal computer 10, is stored in ROM 18.

Embodiments described herein can be applied in the context of computer systems other than personal computer 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, in one embodiment program modules are located in either local or remote memory storage devices or simultaneously in both local and remote memory storage devices. Similarly, in one embodiment any storage of data associated with embodiments described herein is accomplished utilizing either local or remote storage devices, or simultaneously utilizing both local and remote storage devices.

Computer 10 further includes a hard disc drive 24, an external memory device 28, and an optical disc drive 30. In one embodiment, external memory device 28 includes an external disc drive or solid state memory that is attached to computer 10 through an interface such as Universal Serial Bus interface 34, which is connected to system bus 16. Optical disc drive 30 is illustratively utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage for the personal computer 10 on which computer-executable instructions and computer-readable data structures are stored. In another embodiment, other types of media that are readable by a computer, or other device or system, are used in the exemplary operation environment.

In one embodiment, a number of program modules are stored in the drives and RAM 20, including an operating system 38, one or more application programs 40, other program modules 42 and program data 44. In one embodiment, application programs 40 include any of the applications, robots and/or application interfaces discussed above and program data 44 includes data stored in any of the databases or lists discussed above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) can also be included, but have not been illustrated.

In one embodiment, the personal computer 10 operates in a network environment utilizing connections to one or more remote computers, such as a remote computer 52. For example, the remote computer 52 is a server, a router, a peer device, or other common network node. In one embodiment, remote computer 52 includes many or all of the features and elements described in relation to personal computer 10, although only a memory storage device 54 has been illustrated in FIG. 8. The network connections depicted in FIG. 5 include a local area network (LAN) 56 and a wide area network (WAN) 58. Such network environments are commonplace in the art.

The personal computer 10 is connected to the LAN 56 through a network interface 60. The personal computer 10 is also connected to WAN 58 and includes a modem 62 for establishing communications over the WAN 58. The modem 62, which is internal or external, is connected to the system bus 16 via the I/O interface 46.

In a networked environment, program modules depicted relative to the personal computer 10, or portions thereof, are stored in the remote memory storage device 54, in one embodiment. For example, application programs stored utilizing memory storage device 54. In addition, data associated with an application program, such as data stored in the databases or lists described above, are illustratively stored within memory storage device 54. It will be appreciated that the network connections shown in FIG. 5 are exemplary and other means for establishing a communications link between the computers, such as a wireless interface communications link, can be used.

Figure 6:
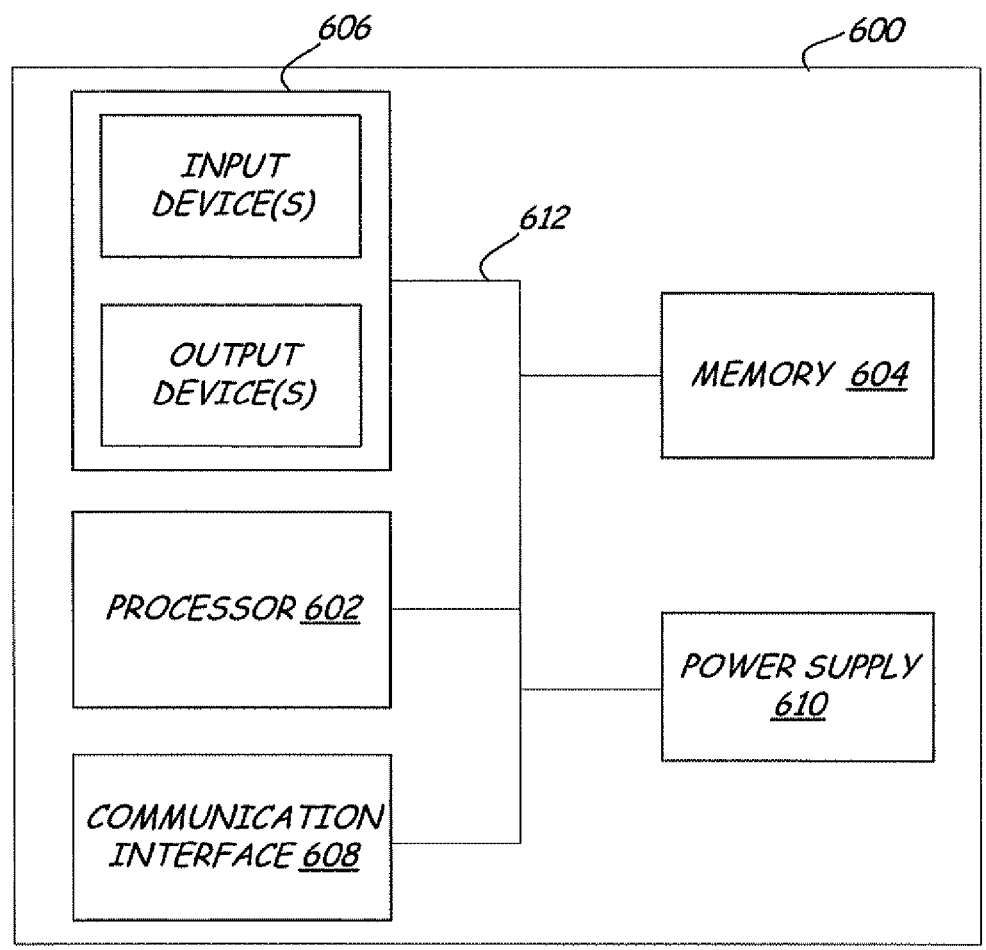
FIG. 6 is a block diagram of an alternative computing environment in which embodiments are implemented.

FIG. 6 is a block diagram of a mobile device 600, which is an exemplary computing environment. Mobile device 600 includes a microprocessor 602, memory 604, input/output (I/O) components 606, and a communication interface 608 for communicating with remote computers or other mobile devices. Further, mobile device 600 also includes a power supply 610. In one embodiment, the aforementioned components are coupled for communication with one another over a suitable bus 612.

Memory 604 represents computer-readable media and includes volatile and/or non-volatile memory such as, but not limited to, random access memory (RAM), dynamic RAM, static RAM, magnetoresistive RAM, read-only memory (ROM), flash memory, a hard disc, floppy and/or removable disc, electrically erasable programmable read-only memory (EEPROM), to name a few. In one embodiment, memory 604 includes one or more hard discs, such as magnetic and/or optical discs.

Communication interface 608 includes one or more components configured to communication through communication channel(s) to enable mobile device 600 to send and receive information. The communication interface 608 includes devices such as wired and wireless modems, satellite receivers and broadcast tuners to name a few. In one embodiment, mobile device 600 is directly connected to a computer to exchange data therewith. Further, in one embodiment interface 608 includes an infrared transceiver or a serial or parallel communication connection, all of which are capable of transmitting streaming information.

I/O components 606 includes input and/or output devices. Examples of input devices include, but are not limited to, a keyboard, keypad, mouse, touch-sensitive screen, buttons, rollers, trackball, trackpad, and/or a microphone. Examples of output devices include, but are not limited to, an audio generator, a vibrating device, and a display. The devices listed above are by way of example and need not all be present on mobile device 600. In addition, other input/output devices can be attached to or found with mobile device 600.

FIGS. 5 and 6 illustrate exemplary computing devices that are utilized by a user to access task management tool interface 100. In one embodiment, user interface 100 comprises a software application that is stored and implemented locally in the computing device. In another embodiment, the exemplary computing devices of FIGS. 5 and 6 are client devices configured to access user interface 100 through a network. For example, in one embodiment user interface 100 comprises a Web application that is accessible by a user over a network, such as the Internet.

Figure 7:
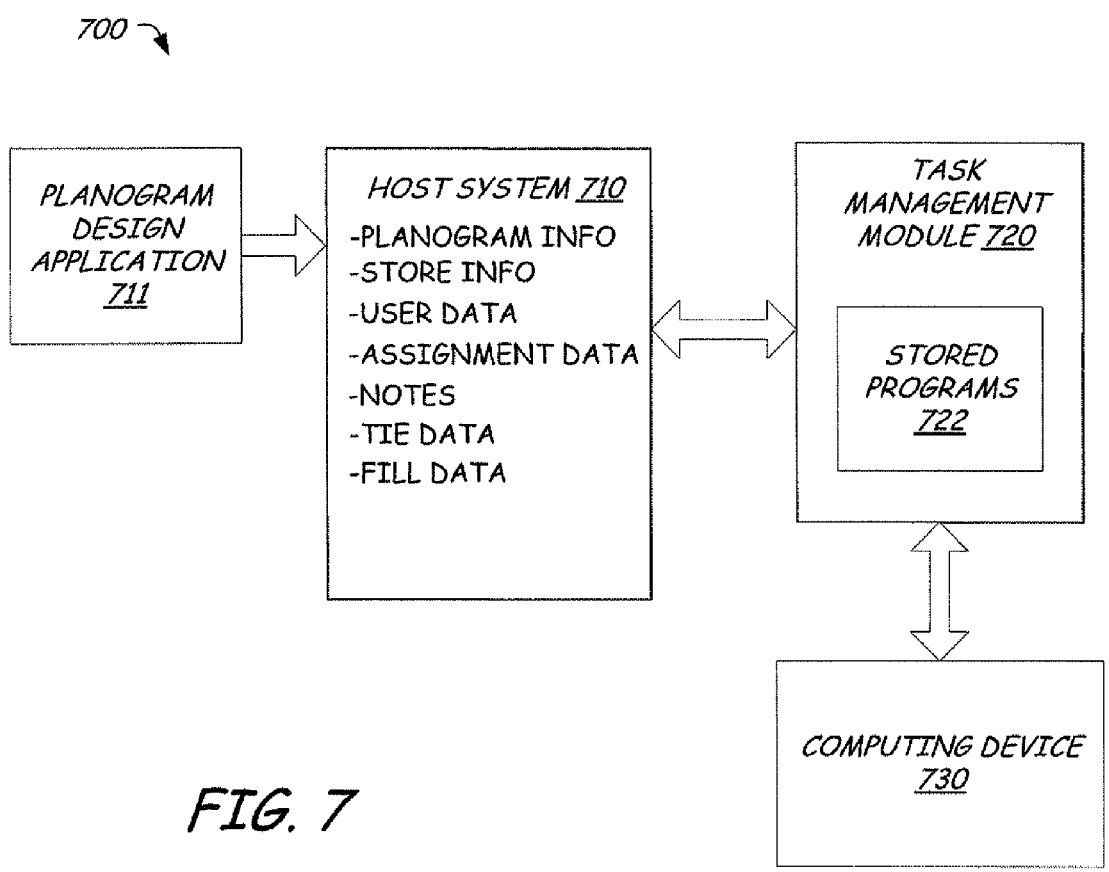
FIG. 7 is a diagram of a task planning and management system, under one embodiment.

FIG. 7 is a schematic diagram of a task management system 700. System 700 is an example of a distributed architecture for implementing embodiments described herein. In the embodiment illustrated in FIG. 7, task management system 700 includes a host system 710 communicatively coupled to a task management module 720. Task management module 720 resides within host system 710 and/or is configured to communicate with host system 710 through a communication channel, such as a network. Examples of a network include, but are not limited to, a personal area network (PAN), a local area network (LAN), wide area network (WAN), and/or a global area network (GAN). Further, in one embodiment host system 710 and module 720 are configured in a server-client and/or peer-to-peer architecture.

In one embodiment, task management module 720 is a Web application that is accessible via a network, such as the Internet or an intranet. For example, task management module 720 comprises a computer software application that is coded in a browser-supported language, such as, but not limited to, HTML, ASP, PHP, Perl, and the like. In the illustrated embodiment, task management module 720 is accessible via a browser operating on a computing device 730. Examples of computing device 730 include computing devices 10 and 600, illustrated in FIGS. 5 and 6, respectively.

In one embodiment, task management module 720 uses dynamic Web content technology, such as ASP, ASP.NET, CGI, JAVA, and the like, to provide content in the form of user interfaces, functions, and/or applications to computing device 730 through queries and requests to host system 710. In one embodiment, task management module 720 includes stored programs 722 for accessing stored procedures within host system 710. In one example, task management module 720 uses programming language calls, such as Java calls, to access procedures stored in host system 710. The stored procedures in host system 710 include, for example, Structured Query Language (SQL) code for creating, accessing, retrieving, and/or managing data in a database associated with host system 710.

Computing device 730 communicates with module 720 through a communication channel, such as a network. Examples of a network include, but are not limited to, a personal area network (PAN), a local area network (LAN), wide area network (WAN), and/or a global area network (GAN). In the illustrated embodiment, computing device 730 communicates with module 720 through the Internet. In one embodiment, computing device 730 is configured to communicate with module 720 using an intranet and/or an extranet. Further, examples of communication channels include wired connections, such as Ethernets, and/or wireless connections, such as, but not limited to, wireless LAN, Wi-Fi, Bluetooth communication, radio communication, cellular communication, to name a few.

In one embodiment, task management system 700 is utilized to create, plan, manage, and perform tasks and projects at different levels within an organization. For example, host system 710 represents a management level within an organization, such as a business, that generates tasks and projects to be performed by constituents of the organization. In the embodiment illustrated in FIG. 7, a design application, illustratively a planogram design application 711, is provided and configured to generate planograms. Planograms generated by design application 711 are stored by host system 710 and are accessed by computing device 730 through task management module 720.

Host system 710 includes additional data associated with the planograms provided by application 711, such as store information and user data. The store information includes data that links particular stores to one or more of the planograms provided by application 711. For example, some businesses have numerous store locations across a large geographic region. In this context, the store information is utilized to account for regional differences in products and tasks to be performed. For instance, stores in different geographic locations are assigned different planograms relating to different types of merchandise. User data includes information relating to employees and associated scheduled work hours.

Host system 710 also includes assignment data relating to assignments of the planograms. For example, through task management module 720 a user at computing device 730 assigns planograms to one or more employees. The assignment information is provided to and stored at host system 710. Further, host system 710 also includes stored notes relating to the planograms as well as information relating to how the planograms are tied and filled within the stores.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   displaying, on a user interface, one or more representations of tasks and a calendar of dates, each representation being indicative of a task to be completed and an estimated time required for completing the task;
   receiving a user input indicative of a selected date from the calendar of dates;

receiving a user input indicative of a selected representation of the one or more representations, wherein the selected representation corresponds to a selected task;

assigning the selected date to the selected task, wherein the selected data is the date the task is scheduled to be performed;

displaying on the user interface a list of employees scheduled to work on the selected date, and displaying on the user interface at least one generic employee representation, the generic employee representation being representative of an employee that is not on the list of employees scheduled to work on the selected date, wherein each entry in the list of employees includes at least a first field containing a number of hours the employee is scheduled to work on the selected data and a second field containing a number of hours the employee has been assigned to perform tasks on the selected date;

receiving a user input indicative of the at least one generic employee representation from the list;

assigning the at least one generic employee representation to the selected task;

updating the second field of the selected at least one generic employee representation to include the estimated time required to complete the selected task; and assigning the generic employee representation to a specific employee not in the list of employees after the at least one generic employee representation is assigned the selected task, wherein the step of displaying one or more representations of tasks comprises displaying categories of tasks arranged by date, displaying a ratio of a number of tasks in each category that have been assigned to a total number of tasks in the respective category, and displaying a number of hours from a total number of hours needed to perform the tasks in the respective category that have been assigned.

2. The method of claim 1, wherein the one or more representations of tasks comprise representations of planograms.

3. The method of claim 1, wherein displaying a calendar of dates comprises displaying a plurality of dates for each day of a selected month as selectable items, and wherein receiving a user input indicative of a selected date comprises receiving a user input indicative of a selected date from the plurality of dates.

4. The method of claim 3 and further comprising visually rendering the one or more representations of tasks, the calendar including a plurality of dates, and the list of employees on the user interface at the same time.

5. The method of claim 1, and further comprising adding an indication of the selected at least one representation of the generic employee to the selected representation.

6. The method of claim 1, wherein receiving a user input indicative of the selected at least one representation of the generic employee from the list comprises:

receiving a user input indicative of a plurality of selected employees, wherein assigning the selected employees to the selected task comprises assigning each of the selected plurality of employees to the selected task.

7. The method of claim 1, and further comprising providing a visual indication for each of the one or more representations of tasks based on whether one or more of a date and an employee has been assigned to each of the tasks.

8. The method of claim 7, wherein providing a visual indication includes color-coding each of the one or more representations of tasks based on whether the representation of the task has been assigned a date and based on whether the representation of the task has been assigned an employee.

9. The method of claim 1, and further comprising:

repeating, for each of a plurality of the representations of tasks, receiving a user input indicative of a selected date from the calendar of dates;

receiving a user input indicative of a selected representation, wherein the selected representation represents a selected task;

assigning the selected date to the selected task;

displaying on the user interface a list of employees as a function of the selected date;

receiving a user input indicative of a selected one or more employees from the list; and assigning the selected one or more employees to the selected task.

10. The method of claim 1, and further comprising:

receiving a user input indicative of a priority for the selected task; and providing a list including a representation for the selected task, wherein the list is provided based on the priority for the selected task.

11. A computer-readable non-volatile medium storing instructions that, when executed by a computer, cause the computer to perform a method, the method comprising:

providing a user interface including a plurality of user interface controls;

displaying in the user interface a plurality of selectable dates and a list of selectable task entries, wherein each task entry represents a task to be completed and an estimated task completion time;

receiving an indication of a selected date from the plurality of selectable dates;

displaying in the user interface a list of selectable employee entries that are scheduled to work on the selected date, wherein each employee entry includes a number of hours that the employee is scheduled to work on the selected date and a number of hours the employee has been assigned tasks on the selected date;

receiving an indication of a selection of multiple employees from the list of selectable employees;

receiving an indication of a selected task entry from the list of selectable task entries and, in response, modifying the selected task entry to include an indication that the selected task entry has been assigned to the selected date and the selected multiple employees;

updating each of the employee entries of the selected multiple employees by adjusting the number of hours the employee has been assigned tasks on the selected date to include the estimated task completion time of the selected task entry, wherein the estimated task completion time is divided evenly among the selected multiple employees;

color-coding each task entry in the list of selectable task entries with a first color if the task entry has not been assigned to a date and an employee;

color-coding each task entry in the list of selectable task entries with a second color if the task entry has been assigned to a date but has not been assigned to an employee; and color-coding each task entry in the list of selectable task entries with a third color if the task entry has been assigned to a date and an employee, wherein the first, second, and third colors are different, wherein the step of displaying one or more representations of tasks comprises displaying categories of tasks arranged by date, displaying a ratio of a number of tasks in each category that have been assigned to a total number of tasks in the respective category, and displaying a number of hours from a total number of hours needed to perform the tasks in the respective category that have been assigned.

12. The medium of claim 11, wherein modifying the selected task entry to include an indication comprises:
adding at least one text field to the selected task entry that represents the selected date and the selected multiple employees.

13. A method comprising:
selecting a task representation that represents a selected task that is to be completed from a list of task representations displayed in a task window of a user interface;
selecting a date from a plurality of selectable dates displayed on a calendar in a calendar window of the user-interface, the calendar including a plurality of selectable dates for each day of a selected month and wherein the selected date is highlighted after being selected;
selecting an employee from a list of employee entries displayed in an employee window of the user interface to assign both the selected date and the selected employee to the selected task without selecting any other representation in the user interface, each entry including a number of hours the employee has been assigned tasks on the selected date;
updating the number of hours the selected employee has been assigned tasks on the selected date to include the estimated task completion time of the selected task entry;
wherein the task window, the calendar window, and the employee window are displayed in the user interface at the same time while the steps of selecting the task representation, selecting the date and selecting the employee are performed;
defining and displaying categories of tasks arranged by date;
determining a ratio of a number of tasks in each category that have been assigned to a total number of tasks in the respective category; and
displaying a number of hours from a total number of hours needed to perform the task in the respective category that have been assigned.

14. The method of claim 13, wherein the user interface comprises:
a task representation color-coded with a first color if a date and an employee have not been assigned to the task representation;
a task representation color-coded with a second color if a date has been assigned to the task representation but an employee has not been assigned to the task representation; and
a task representation color-coded with a third color if a date and an employee have been assigned to the task representation, wherein the first, second, and third colors are different.

15. The method of claim 13, and further comprising:
selecting a second task representation that represents a second selected task from the list of task representations and, in response, assigning the selected date and the selected employee to the second selected task.

16. The method of claim 15, wherein the second task representation is selected after the selected date and selected employee are assigned to the selected task, and wherein assigning the selected date to the second selected task is based on the indication of the selected date.

17. The method of claim 13, further comprising selecting a control button displayed on the user interface such that an additional list of employee entries is displayed on the user interface that was not otherwise provided in the displayed list of employee entries scheduled to work on the selected date.

18. The method of claim 13, wherein the list of employee entries displayed on the user interface further comprises a list of generic employee representations such that the selected task can be assigned to one or more of the generic employee representations.

* * * * *